Figure 1:
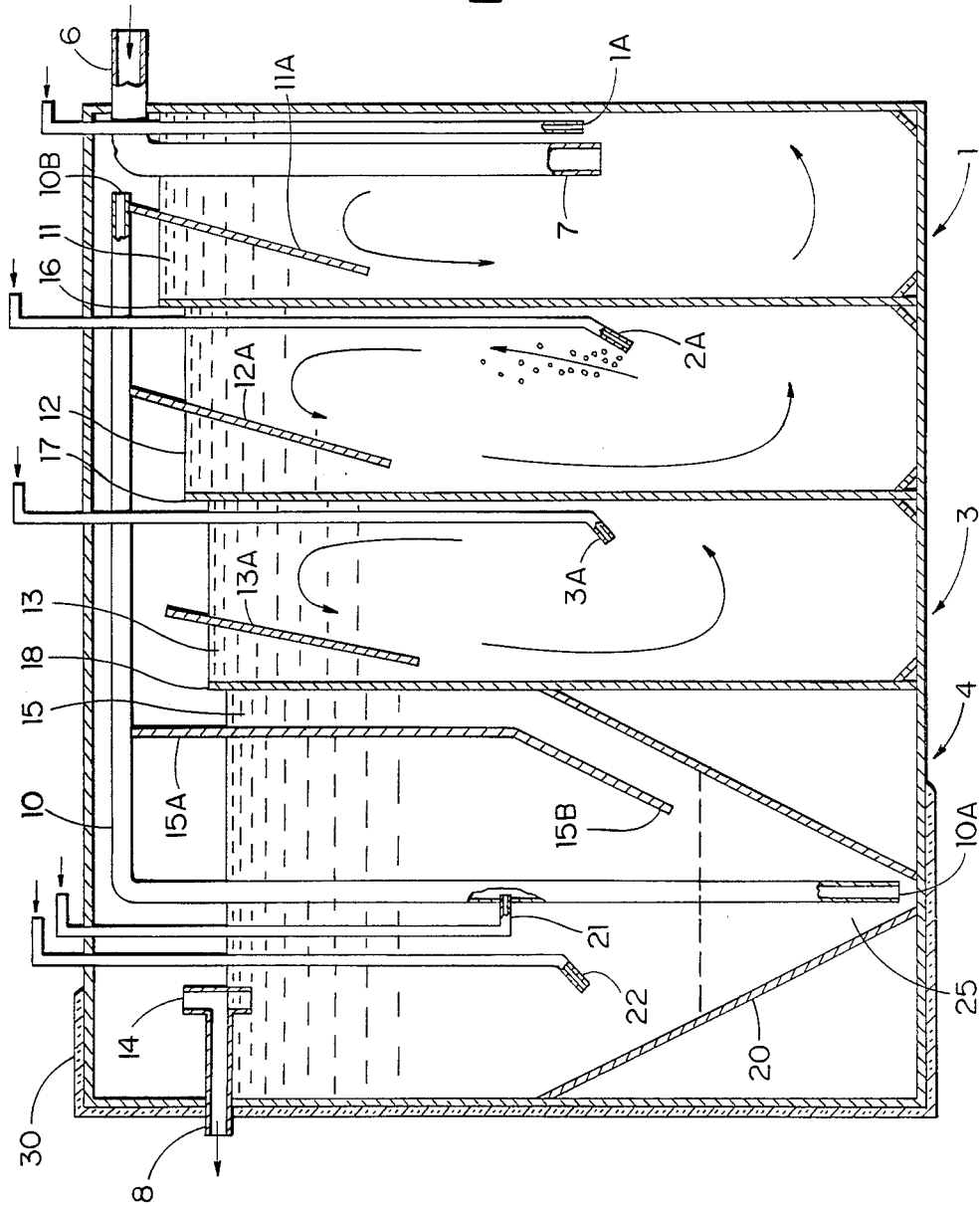

United States Patent [19]

Skaar et al.

[11] Patent Number: 4,950,396
[45] Date of Patent: Aug. 21, 1990

[54] BIOLOGICAL SEWAGE TREATMENT PLANT

[75] Inventors: Roald Skaar, Maudal; Einar Linkjendal, Audnedal; Torstein Wremer; Ragnar Skeie, both of Mandal, all of Norway

[73] Assignee: Bioscan A.S., Mandal, Norway

[21] Appl. No.: 347,590

[22] Filed: May 5, 1989

[51] Int. Cl.$^5$ .................................................. C02F 3/20
[52] U.S. Cl. .............................. 210/195.3; 210/195.4; 210/221.2; 210/255; 210/259
[58] Field of Search ........................ 210/195.3, 197, 202, 210/221.2, 255, 259, 320, 532.2, 195.4

[56] References Cited

U.S. PATENT DOCUMENTS

| | | | |
|---|---|---|---|
| 2,027,370 | 1/1936 | Currie | 210/259 |
| 2,574,685 | 11/1951 | Baxter et al. | 210/195.4 |
| 3,161,590 | 12/1964 | Weis et al. | 210/320 |
| 3,195,727 | 7/1965 | Kibbee | 210/320 |
| 3,260,368 | 7/1966 | Wagner et al. | 210/320 |
| 3,312,346 | 4/1967 | Walker | 210/195.3 |
| 3,507,393 | 4/1970 | Weis et al. | 210/221.2 |
| 3,837,494 | 9/1974 | Stevenson | 210/259 |
| 4,021,347 | 5/1977 | Teller et al. | 210/320 |
| 4,092,249 | 5/1978 | La Gatta | 210/197 |
| 4,332,681 | 6/1982 | Jambry et al. | 210/532.2 |
| 4,376,702 | 3/1983 | Small | 210/255 |
| 4,680,111 | 7/1987 | Ueda | 210/202 |

FOREIGN PATENT DOCUMENTS

| | | |
|---|---|---|
| 2635670 | 2/1978 | Fed. Rep. of Germany . |
| 2741142 | 4/1979 | Fed. Rep. of Germany . |
| 54-51254 | 4/1979 | Japan . |
| 63-166495 | 7/1988 | Japan . |

*Primary Examiner*—Richard V. Fisher
*Assistant Examiner*—Christopher Upton
*Attorney, Agent, or Firm*—Fleit, Jacobson, Cohn, Price, Holman & Stern

[57] ABSTRACT

Biological sewage treatment plant comprising at least one treatment or aeration tank (1, 2, 3,) for the biological process, having an inlet (6, 7) for sewage, an outlet (14, 8) for treated water and a conduit (1, 2, 3) for air supply down in each treatment tank. There is also provided a settling tank (4) with a conduit (10) for feeding back sludge from the bottom thereof to a preceeding treatment tank (1), said air supply conduit in each treatment tank (1, 2, 3) being provided with its outlet (1A, 2A, 3A) adjacent to a vertical wall in the treatment tank. A baffle plate (11A, 12A, 13A) extends from a level above the operational water level in the treatment tank at an inclination downwards-inwards towards a vertical wall part in the tank opposite said vertical tank wall, for establishing a clarifier chamber (11, 12, 13) which is separated from the main part of the tank, but communicates with the latter through a lower opening in the clarifier chamber. The clarifier chamber has a volume which constitutes a small fraction of the total volume of the treatment tank. All treatment tanks (1, 2, 3) are arranged end to end in the longitudinal direction of the process, and the outlet from each treatment tank is provided in the form of an overflow sill (16, 17, 18) from the clarifier chamber (11, 12, 13) to the following treatment tank (2, 3 and 4 respectively), said overflow sill being formed completely or in part by a substantially horizontal edge at the top of the wall between (1A, 2A, 3A) for air two successive tanks (1, 2, 3, 4).

7 Claims, 2 Drawing Sheets

BIOLOGICAL SEWAGE TREATMENT PLANT

This invention relates to a biological sewage treatment plant, in particular intended for the treatment of sewage from single houses having a moderate number of inhabitants. Such mini treatment plants comprise at least one treatment or aeration tank for the biological process, an inlet for sewage, an outlet for treated water and a conduit for air supply down in each treatment tank. Moreover there is usually included a settling tank as the last step in the treatment, with a conduit for feeding back sludge from the bottom thereof to a preceeding treatment tank, for example the first tank in a series of two or more treatment tanks.

Previously there has been proposed various arrangements of this type of mini treatment plants, in which it has essential importance that sufficient amounts of oxygen, i.e. air, is supplied to the sewage, in order for the treatment process to be efficient. Practical experience with the operation of previously known treatment plants has shown inter alia that more or less undesired waste objects which can be introduced into the plant will lead to problems, such as clogging in narrow openings and so on.

As examples of previously known techniques reference can be made more specifically to published German patent applications Nos. 1.912.584 and 2.741.142. The latter relates to a treatment plant with several steps having approximately the same water level in the different tanks or steps, these being in communication with each other through tubular channels at substantially the same level corresponding to the common water level. Waterflow can take place in both directions through these conduits. Air blown down into the tanks causes water circulation therein. The former German patent application describes treatment in a single tank (possibly a double tank) with air injection in order to establish a circulating water movement.

Like the present invention the above two known arrangements are based upon the subdivision of a clarifier chamber in each tank. Considered in relation to the respective clarifier chambers the direction of water circulation is opposite in the two German patent applications.

The present invention is directed to a biological treatment plant consisting of several steps and having a highly improved treatment function and a simplified design which is very robust with respect to the various forms of waste which may occur, and therefore is very reliable in operation. Moreover it is an object of the invention to propose an arrangement or plant which to a high degree is space-saving in installation and makes possible an efficient manufacture.

Thus, on the above background the present invention provides a biological sewage treatment plant comprising at least one treatment or aeration tank for the biological process, having an inlet for sewage, an outlet for treated water and a conduit for air supply down in each treatment tank, and further comprising a settling tank with a conduit for feeding back sludge from the bottom thereof to a preceeding treatment tank, said air supply conduit in each treatment tank being provided with its mouth adjacent to a vertical wall in the treatment tank, a baffle plate extending from a level above the operational water level in the treatment tank at an inclination downwards-inwards towards a vertical wall part in the tank opposite said vertical tank wall, for establishing a clarifier chamber which is separated from the main part of the tank, but communicates with the latter through a lower opening in the clarifier chamber, said clarifier chamber having a volume which constitutes a small fraction of the total volume of the treatment tank, all said treatment tanks being arranged end to end in the longitudinal direction of the process, and the outlet from each treatment tank being provided in the form of an overflow sill from the clarifier chamber to the following treatment tank, said overflow sill being formed completely or in part by a substantially horizontal edge at the top of the wall between two successive tanks.

Figure 2:
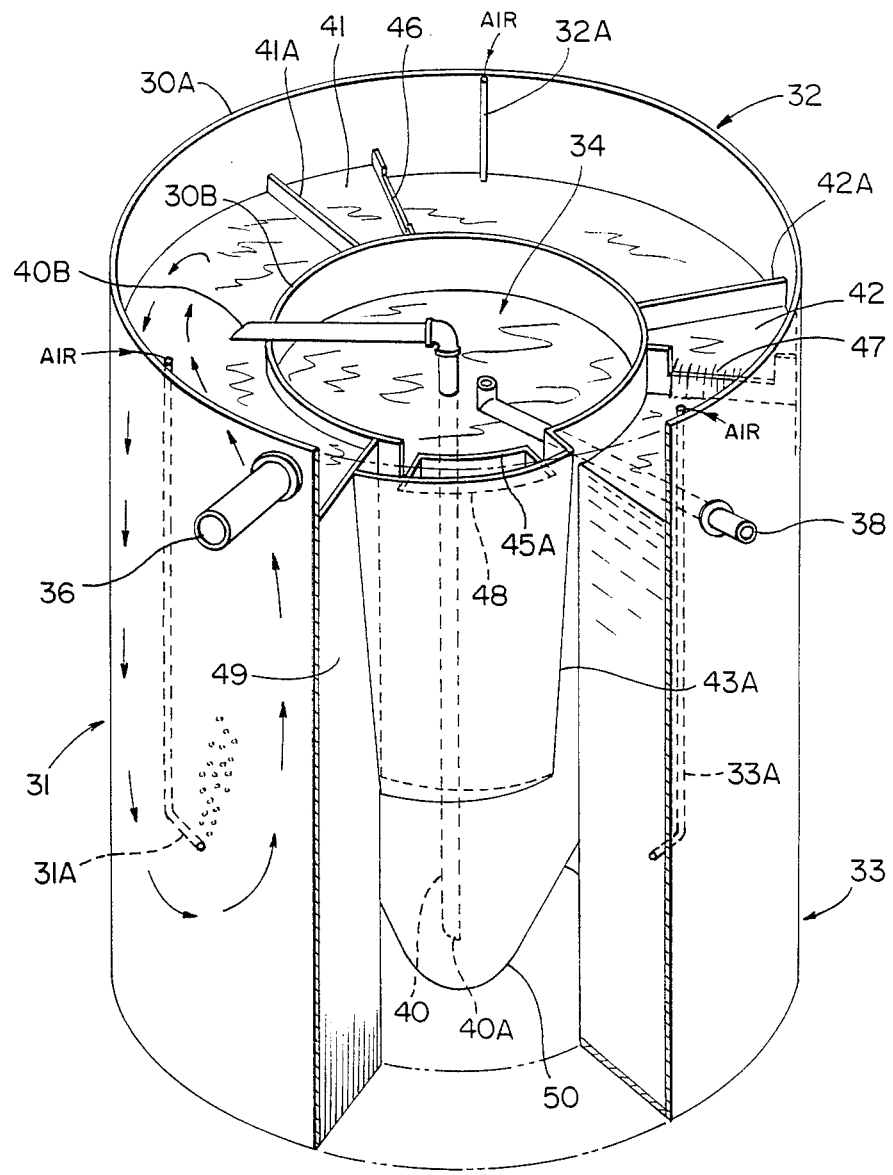

The invention shall be explained in more detail below with reference to the drawings in which:

FIG. 1. in a somewhat schematic vertical and longitudinal section shows an example of a treatment plant according to a first embodiment of this invention, FIG. 2 shows a second exemplary embodiment of a biological sewage treatment plant according to this invention, being based on a circular arrangement of treatment tanks.

As seen from the right hand side cf FIG. 1 this embodiment of the treatment plant comprises in succession three treatment or aeration tanks 1, 2 and 3, with a following settling tank 4. These upright tanks have all a rectangular or square base and are arranged in a row the longitudinal direction of which from the right to the left in FIG. 1, corresponds to the general flow direction of the sewage being treated stepwise through the plant. Thus all tanks 1, 2, 3 and 4 as shown can be arranged end to end in the longitudinal direction, i.e. with common walls to separate between the tanks 1 and 2, 2 and 3 as well as 3 and 4 respectively.

The supply of sewage or waste water to be treated, takes place through an inlet 6 which is immersed to a good depth within the tank 1 in the form of a vertical tube 7. As shown at the bend between the inlet 6 and the tube 7 there can as usual be provided an opening for venting upwards, e.g. above the roof of a house in which the treatment plant is installed.

As will be seen from the drawings &he water level in the tanks falls stepwise towards an outlet 8 from the settling tank 4. The progressivly lower surface levels are mainly determined by overflow sills being formed completely or in part by a substantially horizontal edge 16, 17 and 18 at the top of the respective separation walls between any two successive tanks 1, 2, 3 and 4. These overflow sills or edges 16, 17, and 18 are in principle rectilinear and horizontal at the top of the separation walls between the tanks shown. The transfer of water in succession from one tank to the next is provided for in such an arrangement with high reliability and without any risk of clogging or damming up because of problematic waste objects which usually cannot be avoided in such plants. If, for example, the width of tanks 1, 2, 3 and 4 is 60 cm, the overflow sills 16, 17 and 18 may have a length of about 60 cm. Should it be desirable to have a somewhat slower flow from tank to tank, in particular for taking into account large shock loads, the length of the overflow sills may be somewhat reduced.

The overflow from each treatment tank 1, 2 or 3 is located in a specific clarifier chamber, shown at 11, 12 and 13 in the respective tanks, these chambers being subdivided from the remaining tank volume by a baffle plate 11A, 12A and 13A respectively. As shown in FIG. 1 these baffle plates or walls extend from a level above the operational water level in the tanks at an inclination downwards -inwards towards a vertical wall part in the tank, i.e. the separation walls between these as mentioned above. The clarifier chambers 11, 12, and 13 communicate with the remaining tank volume through a lower, narrow opening. The location and the inclination of these baffle plates is closely related to the stirring and circulating effect being caused by the air injection into each of the treatment tanks 1, 2 and 3.

Each of these tanks is provided with an air supply conduit having a mouth or nozzle as shown at 1A, 2A and 3A respectively, in the three treatment tanks. Air for the treatment is supplied from an air-pump (not shown) for example a centrifugal fan which can supply an adjusted amount of air to each of the treatment tanks at the required pressure. As shown the mouths 1A, 2A and 3A of the air supply conduits are located at a good depth down in the tanks and adjacent to a vertical tank wall opposite that wall towards which the baffle plate 11A, 12A and 13A is inclined, within the same tank. Air bubbles from the outlets of the air conduits will be introduced into the surrounding water and will rise as illustrated with arrows in the tanks 1, 2 and 3, so that there is provided for a circulation of the water in each of these tanks. This circulation goes upwards along the wall above each of the air outlets and downwards first along the baffle plates 11A, 12A and 13A and then further towards the bottom of each tank.

This circulation pattern has been found to be particularly favourable in view of the desired stirring of the water volume and the admixture of supplied air into the water. As already suggested above the clarifier chambers 11, 12 and 13 play a substantial role in this connection, since the arrangement of baffle plates or walls to a high degree contributes to this favourable circulation, at the same time as the water movement has such an effect that solid particles in the water cannot easily enter upwards into the respective clarifier chambers 11, 12 and 13. The water overflowing from each treatment tank 1, 2 and 3 to the following tank through the respective clarifier chambers 11, 12 and 13, will therefore be relatively clean and free of particles etc., compared to the main volume of water in each of the treatment tanks 1, 2 and 3. In this connection it will be seen that the volume within the clarifier chambers is very small in relation to the total volume of each tank. As shown in the example of FIG. 1 the volume of the clarifier chambers is moreover stepwise reduced from tank to tank, so that the chamber 13 has the smallest volume and the first chamber 11 the largest volume. For the co-operation between the clarifier chamber and the main portion of the tanks, it is significant that the baffle walls 11A, 12A and 13A are not extended too deep into the tanks, but should preferably be located in the upper half of each tank. Further it is an advantage that the area of the water surface in the clarifier chambers at the operational water level is smaller than the area of the water surface in the remaining part of the treatment tank.

The lower part of the settling tank 4 is provided with inclined walls 20 for the purpose of collecting sludge 25 at a concentrated region near the bottom of the tank, in order to be sucked up through a sludge return conduit 10 having an outlet 10A adjacent to the bottom of the settling tank 4. The feeding back of sludge can take place by means of an airlift effect, provided for by injecting air through a conduit having its mouth at 21 at a certain depth on the vertical part of the sludge return conduit 10 in the tank 4. At the opposite end the return conduit 10 discharges returned sludge at the top of the tank 1 through and opening 10B.

As also known per se, the settling tank 4 can be provided with an air conduit having an outlet 22 for causing a stirring effect, for example once a week.

Water which is fed to the settling tank from the last treatment tank 3, enters the former through a rather wide passage 15 formed at the separation wall between tanks 3 and 4 by means of a vertical baffle wall 15; the lower part of which continues as an inclined wall part having a lower edge 15B. It will be realized that with such an arrangement there is a comparatively large water volume present within the passage 15, so that the flow velocity therein will be rather low. Accordingly the water movement from the opening at the bottom of passage 15 will be very quiet and will not disturb the settling effect within tank 4.

Biological sewage treatment plants of the present type will usually be installed in relatively cold premises, e.g. in basements, which can be unfavourable to the biological process which proceeds more slowly at lower temperatures. In order to give the plant and the process more favourable temperature conditions there is shown ar insulating layer 30 on the outside of the whole row of tanks. This layer can consist of materials being known per se, and with a suitable thickness depending on the installation concerned, among other things on the average temperature of the sewage received at the plant and in particular the ambient temperature. In this connection it has been found that also the flow conditions in the tank plant can be influenced by varying temperatures between the inflowing sewage or waste water and the water volume in the respective tanks. Particularly for the purpose of avoiding a too strong stirring effect by the inflowing water to the settling tank 4 as a result of large temperature differences between the inflowing water and the amount of water being present in tank 4, it is an advantage that at least this tank is provided with the heat insulation 30. Thus the settling tank 4 under the most common conditions will have a lower temperature than the water in the preceeding treatment tanks, since the sewage supplied through the inlet 6 as a rule will have a somewhat elevated temperature.

In order to facilitate transportation and installation in small dwelling houses, the outer dimensions of the tank plant are chosen taking into account inter alia the usual door dimensions in such houses. As mentioned the width can for example suitably be about 60 cm, whereas the upright tanks can have a height of for example about 2 m. A further step towards a plant's being easy to transport and install is a subdivision of the individual tanks, in particular the treatment tanks 1, 2 and 3, to separate units or modules which can easily be assembled to the complete plant as described.

As shown at the bottom of the treatment tanks 1, 2 and 3 at the junction between the vertical tank walls and the bottom, there can be provided small roundings or sloping surfaces which, in connection with the flow patterns discussed above, contribute to preventing undesired solid deposits of sludge and the like at these parts of the tanks.

As will appear from the above description with reference to FIG. 1, the rectangular or square base shape of the tanks as described, in connection with the arrangement of air supply and baffle plates, leads to great advantages with respect to both an efficient water movement within and between the tanks, and a structure of the plant as a whole being favourable in practice.

The plant as described here can easily be supplemented with sludge discharge conduits being permanently arranged for one or more of the tanks 1, 2, 3 and 4 as well as with equipment for introducing chemical agents for possible chemical sewage or water treatment in addition to the biological air treatment and settling as described.

FIG. 2 is an isometric view, with some portions cut away for better illustration, of a second embodiment according to the invention. Instead of a linear row of treatment tanks as shown in FIG. 1, three treatment tanks 31, 32 and 33 form a circular arrangement in FIG. 2, enclosed by a surrounding outer cylindrical wall 30A. Thus, the succession or longitudinal direction of process steps through these treatment tanks 31, 32 and 33 constitutes a circular path or a partial circle.

An inner vertical cylindrical wall 30B forms another side wall for the treatment tanks and encloses a settling tank 34 for the last process step. By means of preferably radial separation walls having upper horizontal edges or sills as shown at 46 and 47, the annular space between the two cylindrical walls 30A and 30B is subdivided into sections, each section constituting a treatment tank 31, 32 and 33 respectively. At the upstream end of tank 31 (and at the downstream end of tank 33) there is a separation wall 49 without any overflow sill on top of it. Instead overflow from treatment tank 33 takes place over a sill 48 formed as a lowered part of the upper edge of the inner cylindrical wall 30B. Baffle plates or walls 41A and 42A subdivide tanks 31 and 32 into main volume and clarifier chambers 41 and 42 respectively. These chambers correspond to clarifier chambers 11 and 12 in treatment tanks 1 and 2 respectively as shown in FIG. 1. In fact the generally cylindrical arrangement in FIG. 2 in principle is built up for performing the same process steps and functions as the linear arrangement of treatment tanks and settling tank in FIG. 1.

The last treatment tank 33 in FIG. 2 has a baffle 48 which is not radial as baffle plates 41A and 42A, but rather more or less cylindrical about an axis which can for example be the axis of symetry of the whole arrangement in FIG. 2. In the settling tank 34 there is shown a vertical baffle wall 45A having a function similar to baffle wall 15A in FIG. 1

A conical lower part 50 of settling tank 34 serves to concentrate the sludge and make possible feed-back of sludge through a return conduit 40 having a lower opening 40A and a discharge opening 40B above treatment tank 31. As in the embodiment of FIG. 1 this return of sludge can be brought about by an air-lift effect.

Sewage or waste water is supplied through an inlet 36 and treated water leaves the treatment plant through an outlet 38.

Air is injected into the treatment tanks 31, 32 and 33 through air conduits shown at 31A (nozzle or air outlet), 32A and 33A. Arrows indicate the water circulation obtained in tank 31 by means of air injected at air conduit nozzle or outlet 31A, this effect being quite the same as explained above with respect to the treatment tanks 1, 2 and 3 in fig. 1.

What is claimed is:
1. Biological sewage treatment plant comprising
a plurality of treatment tanks for a biological treatment process, having an inlet means for sewage, an outlet means for treated water and an air supply conduit with outlet means for supplying air down into each treatment tank,
said air supply conduit in each treatment tank being located with its outlet adjacent to an upstream vertical wall in the treatment tank,
all of said treatment tanks being connected in series so as to establish progressively lower water surface levels in each successive tank, correspondingly to successive treatment steps through the plant during operation,
a settling tank with a conduit for feeding back sludge from the bottom thereof to a preceding treatment tank,
a baffle plate constructed and arranged to extend from a level above a water surface level in each treatment tank at a downward and inward inclination towards a downstream vertical wall in the tank opposite said upstream vertical tank wall for establishing a clarifier chamber separated from a main part of the tank and communicating with the main part of the tank through a lower opening in the clarifier chamber, said clarifier chamber having a volume which is substantially smaller than the total volume of the treatment tank, all of said treatment tanks being arranged end to end in a direction corresponding to said successive treatment steps and with a vertical wall between two successive tanks being common to both tanks of the process, and the outlet from each treatment tank being provided in the form of an overflow sill from the clarifier chamber to the following treatment tank, said overflow sill being formed at least in part by a substantially horizontal edge at the top of the common wall between two successive tanks.

2. Biological sewage treatment plant according to claim 1, wherein a lower edge of the baffle plate in each treatment tank is located in an upper half of the tank.

3. Biological sewage treatment plant according to claim 1, wherein said plant is constructed and arranged and that a water surface area in each clarifier chamber at the water surface level is smaller than a water surface area at the water surface level in a remaining part of the same treatment tank.

4. Biological sewage treatment plant according to claim 1 wherein at least the settling tank is provided with a surrounding heat insulation.

5. Biological sewage treatment plant according to claim 1, wherein each treatment tank and settling tank has a rectangular or square base and the same width.

6. Biological sewage treatment plant according to claim 1, wherein the treatment tanks are surrounded by a vertical cylindrical outer wall, the settling tank is surrounded by a vertical cylindrical inner wall, whereby the treatment tanks are formed as sections between said outer cylindrical wall and said inner cylindrical wall, the separation walls with overflow sills between said treatment tanks being provided transversly from the inner wall to the outer wall, so that a longitudinal direction of the process steps through the treatment tanks constitutes at least or a partial circle.

7. Biological sewage treatment plant according to claim 6, wherein the separation wall between the treatment tanks runs radially from the inner cylindrical wall to the outer cylindrical wall.

* * * * *